(12) United States Patent
Luther

(10) Patent No.: US 10,155,456 B2
(45) Date of Patent: Dec. 18, 2018

(54) CHILDREN'S VEHICLE

(71) Applicant: Franz Schneider GmbH & Co. KG, Neustadt (DE)

(72) Inventor: Rainer Luther, Neustadt (DE)

(73) Assignee: FRANZ SCHNEIDER GMBH & CO. KG, Neustadt (DE)

( * ) Notice: Subject to any disclaimer, the term of this patent is extended or adjusted under 35 U.S.C. 154(b) by 190 days.

(21) Appl. No.: 15/408,591

(22) Filed: Jan. 18, 2017

(65) Prior Publication Data
US 2017/0210250 A1 Jul. 27, 2017

(30) Foreign Application Priority Data

Jan. 21, 2016 (DE) .................. 10 2016 000 524

(51) Int. Cl.
*B60N 2/00* (2006.01)
*B60N 2/08* (2006.01)
*B60N 2/07* (2006.01)
*B60N 2/26* (2006.01)
*B60N 2/68* (2006.01)
*A63H 17/00* (2006.01)
*B60N 2/06* (2006.01)
*B60N 2/38* (2006.01)

(52) U.S. Cl.
CPC ............. *B60N 2/08* (2013.01); *A63H 17/00* (2013.01); *B60N 2/002* (2013.01); *B60N 2/06* (2013.01); *B60N 2/0727* (2013.01); *B60N 2/26* (2013.01); *B60N 2/38* (2013.01); *B60N 2/686* (2013.01)

(58) Field of Classification Search
CPC . B60N 2/38; B60N 2/06; B60N 2/002; B60N 2/08; B60N 2/0727; B60N 2/686; B60N 2/26; A63H 17/00
USPC ............................................ 296/65.01, 65.13
See application file for complete search history.

(56) References Cited

U.S. PATENT DOCUMENTS

| | | | |
|---|---|---|---|
| 6,793,283 B1 * | 9/2004 | Sipos ..................... | B60N 2/062 297/256.12 |
| 8,196,887 B2 * | 6/2012 | Dahlbacka ............... | B60N 2/07 248/424 |
| 2006/0001234 A1 | 1/2006 | Michelau et al. | |
| 2012/0308299 A1 * | 12/2012 | Pallot ..................... | A47C 7/002 403/322.4 |
| 2012/0318949 A1 | 12/2012 | Braun | |
| 2015/0142273 A1 * | 5/2015 | Cuddihy ................ | B60N 2/005 701/49 |

* cited by examiner

*Primary Examiner* — Pinel E Romain
(74) *Attorney, Agent, or Firm* — Greer, Burns & Crain, Ltd

(57) ABSTRACT

The children's vehicle with a seat is characterised by an adjustable locking device, with which a desired position of the seat in the longitudinal direction of the children's vehicle may be set, and a security locking device, which only releases the adjustable locking device for adjustment of the current position when the seat is unloaded.

10 Claims, 8 Drawing Sheets

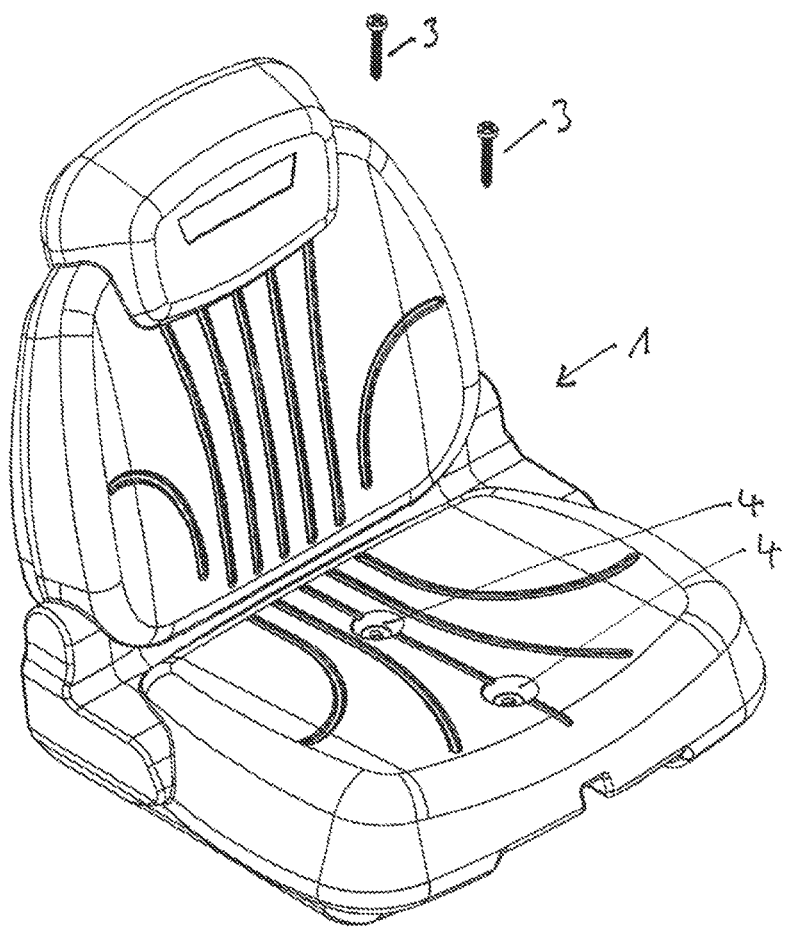
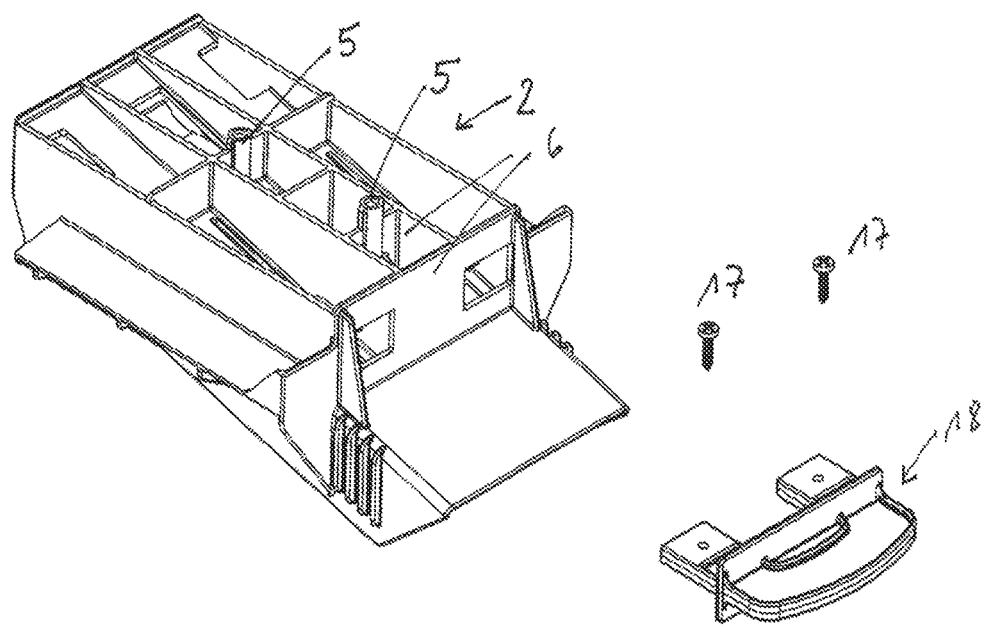
Fig. 1

CHILDREN'S VEHICLE

PRIORITY

This application claims priority under 35 U.S.C. § 119 to German Application No. 10 2016 000 524.6, filed Jan. 21, 2016.

FIELD OF THE INVENTION

The invention relates to a children's vehicle with a seat, on which a child sits in order, for instance, to drive the vehicle with a foot pedal. The children's vehicle can, however, also have a motor or be a so-called ride-on vehicle, in which a child pushes off from the ground with his feet.

SUMMARY OF THE INVENTION

The invention will be described below in connection with a pedal vehicle.

Children's vehicle of the type in question commonly have a fixed, immovable seat.

Since such a children's vehicle is used by children of different ages and different sizes, there is a problem that not every child can reach the pedals so that he can operate them whilst seated in a relaxed and calm manner on the vehicle seat. If a child is too small to reach the pedals with a relaxed posture, the child can slide forwards on his seat, whereby there is the danger that the child falls off the vehicle, e.g. when going round a corner. Large children with long legs can have the problem of having to pull their legs in too much when riding.

It is the object of the present invention to provide a solution for this problem and to arrange the seat adjustably without the adjustability being associated with danger or the risk of injury for a child who wants to operate the adjustment mechanism whilst moving.

This object is solved in accordance with the invention by providing a children's vehicle with a seat, characterised by an adjustable locking device, with which a selected position of the seat in the longitudinal direction (A) of the children's vehicle may be set and a security locking device, which only releases the adjustable locking device for adjustment of the current position when the seat is unloaded.

Advantageous embodiments of the invention are described herein below.

The invention provides that the children's vehicle includes an adjustable locking device, with which one of a number of possible positions of the seat in the longitudinal direction of the children's vehicle may be set, and a security locking device, which only permits the adjustment of the position of the seat when the seat is not loaded by a weight. This is to be understood as meaning that the security locking device prevents adjustment of the position of the seat when a child is sitting on the vehicle seat. In order to be able to move the seat, the child must get off the vehicle, whereby the adjustment mechanism is released.

A child is thus reliably prevented from adjusting the seat whilst moving and also in the rest state of the children's vehicle while he is sitting on the seat so that a child is precluded from falling off the vehicle or otherwise injuring himself as a result of movement of the seat.

In an embodiment of the invention, a seat block can be arranged on the chassis of the children's vehicle, which is either constructed integrally with the chassis or base body of the children's vehicle, when it is made preferably by a blow-moulding method, or which is, for instance, screwed to the base body. This base body should have depressions of the adjustable locking device and the security locking device spaced apart in the longitudinal direction. It is further proposed that secured beneath the seat there is a frame portion, which has a base wall and two parallel side walls, projecting inwardly from which are guide elements, which engage into guide grooves in the outer walls of the seat block. The guide elements can have a different height. It is preferred that each side wall has a front and a rear guide element, wherein the rear guide elements have a greater height than the front guide elements. The seat is secured with its frame portion on the seat block so that it is inserted from the rear edge of the seat block with the guide elements in the guide grooves and slid forwardly until the adjustment mechanism described below locks into a selected position in the longitudinal direction of the seat block. The guide grooves in the outer walls of the seat block have a constriction approximately in the middle of their length, which serves as an abutment for the larger rear guide elements on the frame portion so that the seat cannot be moved further forward on the seat block.

The adjustable locking device has at least one spring arm, preferably two laterally spaced spring arms, which have locking elements in the end region projecting downwardly from the base wall, i.e. towards the seat block, which fit into the depressions of the adjustable locking device in the seat block and, in the relaxed state of the spring arms, engage into respective recesses. The two spring arms arranged adjacent one another are preferably fastened to, preferably integrally formed on, the edge of an associated opening, wherein the longitudinal sides and the free end side of the spring arms can be cut free from the base wall, when their material is sufficiently elastic.

The two spring arms are connected to a handle, which projects forwardly beyond the seat and is liftable in order to permit the locking elements on the free end region of the spring arms to move out of the depressions in the seat block and to adjust the position of the seat, when this is permitted by the security locking device described below.

The security locking device has at least one spring and at least one locking element on the base wall and associated depressions, spaced apart in the longitudinal direction, in the seat block, wherein the at least one spring projects downwardly from the base wall, i.e. towards the seat block, in its relaxed state and raises the base wall with respect to the seat block, when no one is sitting on the seat, whereby, in this state, the at least one locking element is held above the depressions. When, on the other hand, the child sits on the seat, the base wall is forced downwardly against the action of the spring, whereby the at least one locking element moves into one of the depressions.

The spring device preferably consists of a curved leaf spring, which can be attached to the edge of an opening so that, when the seat is loaded, the leaf spring is pressed into the opening and the at least one locking element moves into the depressions. It is preferred that locking elements are formed on both sides of the leaf spring and that two rows of depressions aligned with one another are formed in the seat block. It is stressed in this connection that the arrangement can also be reversed in that the locking elements project from the seat block and corresponding depressions are formed in the base wall.

BRIEF DESCRIPTION OF THE DRAWINGS

Further details of the invention will be apparent from the following description of a preferred embodiment of the children's vehicle and with the aid of the drawings, in which:

FIG. 1 shows the components of the seat in an exploded view;

DETAILED DESCRIPTION OF PREFERRED EMBODIMENTS

Figure 2:
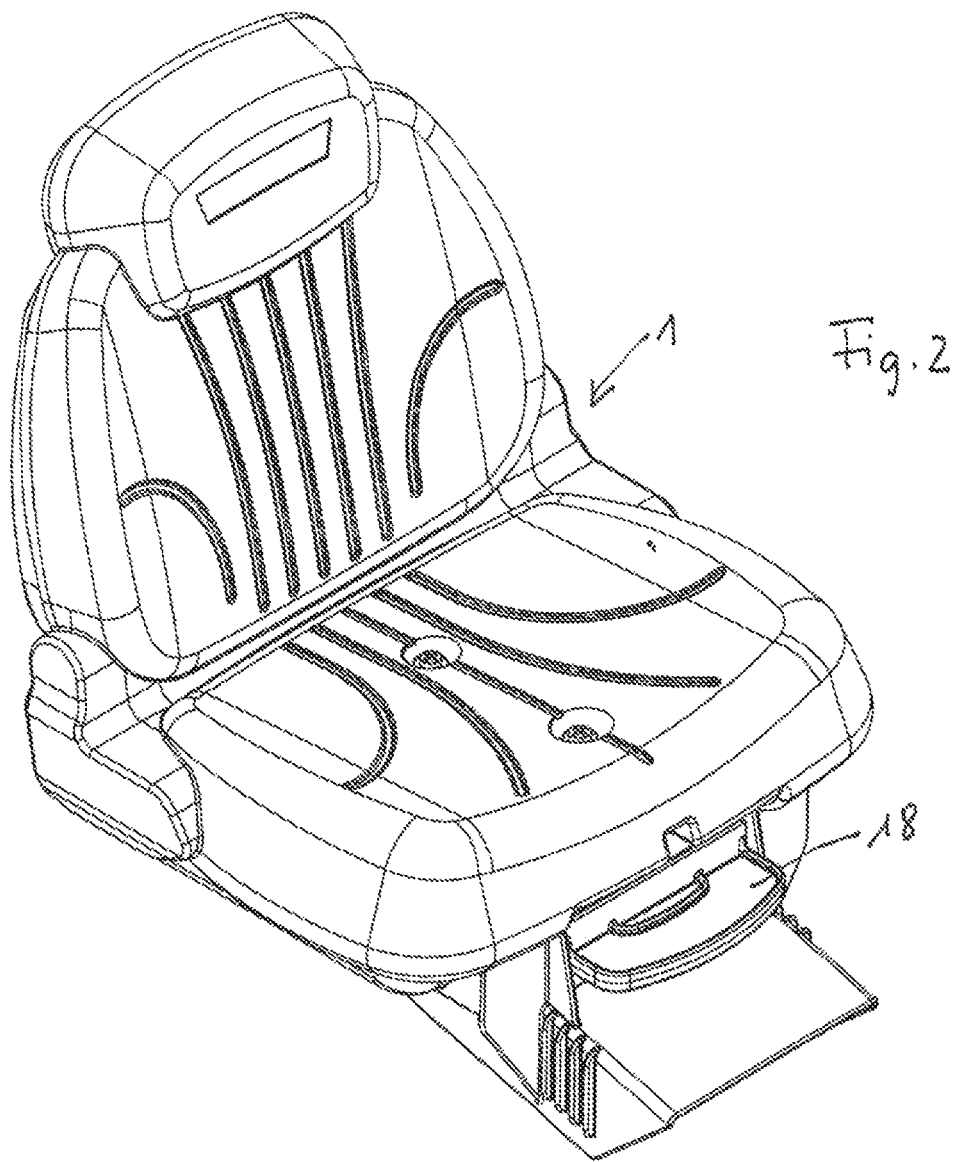
FIG. 2 shows the assembled seat.

Beneath the seat 1, which is made of plastic material in a blow-moulding method, a frame portion 2 is screwed on by means of two screws 3, which are screwed into an internal screw thread in bosses 5 on the frame portion 2 through holes 4 in the seat 1. The frame portion 2, which is stiffened by transverse and longitudinal walls 6, includes, as is shown in particular in FIG. 3, on its underside two parallel side walls 7, which project away from a base wall 8.

Figure 6:
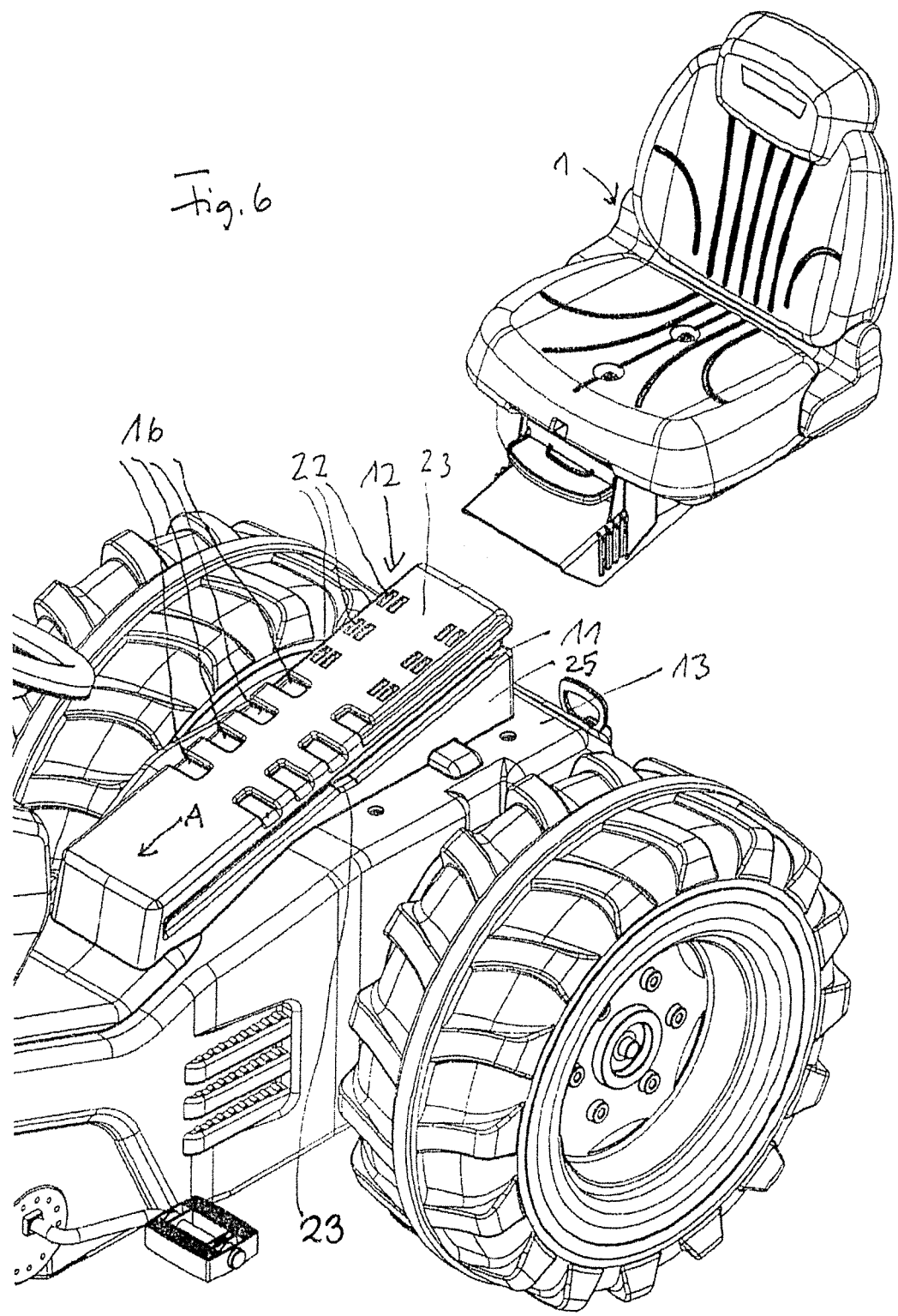
FIG. 6 shows the rear portion of a children's pedal vehicle and the seat before it is fitted.

Attached to the inner sides of the side walls 7 are respective front guide elements 9 and rear guide elements 10. These guide elements 9, 10 engage, when the assembled seat is fitted, in lateral guide grooves in a seat block 12, as shown in FIG. 6. The seat block 12 is a fixed component of the vehicle base body 13.

Figure 3:
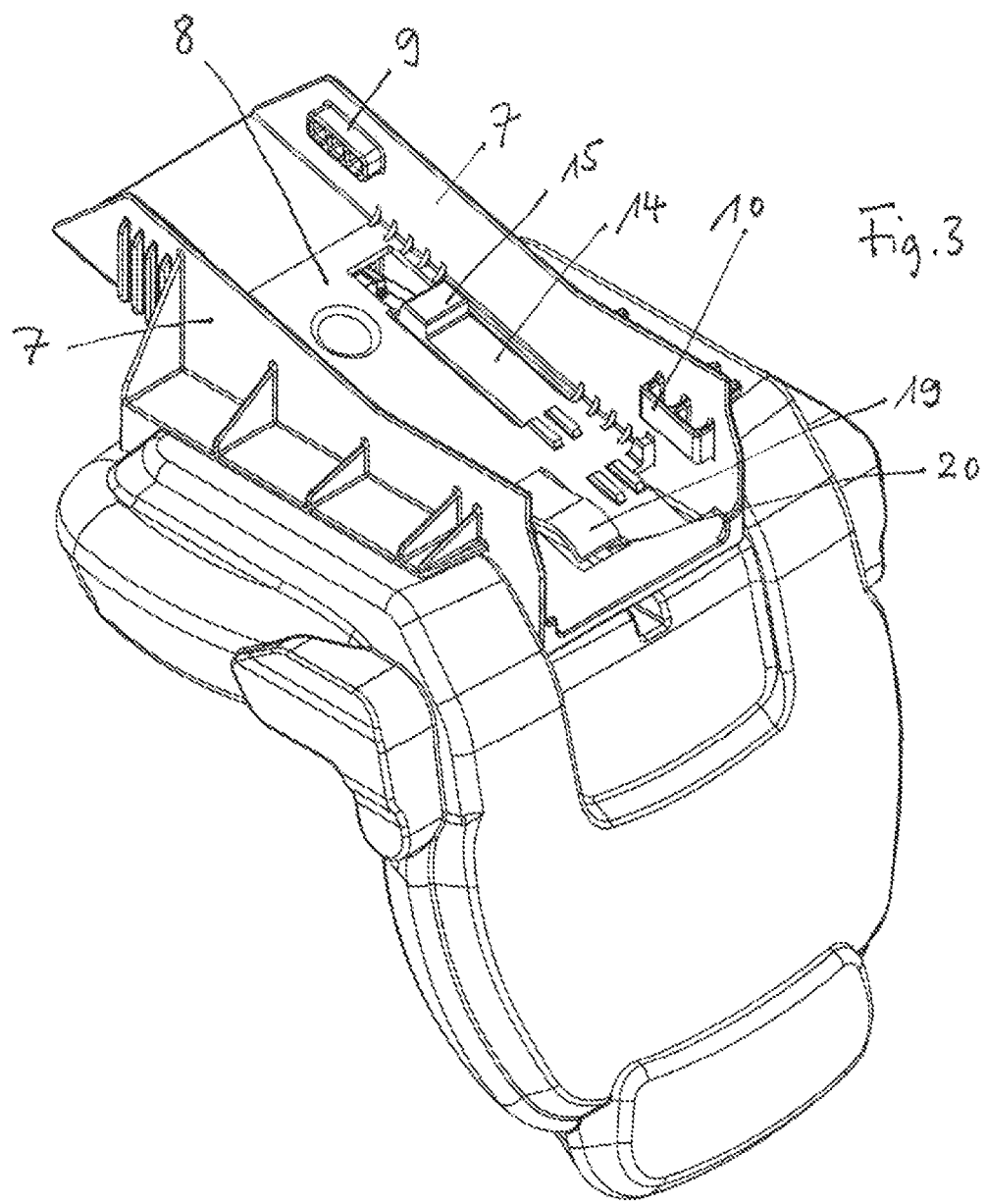
FIG. 3 is a perspective view of the seat from below.
Figure 4:
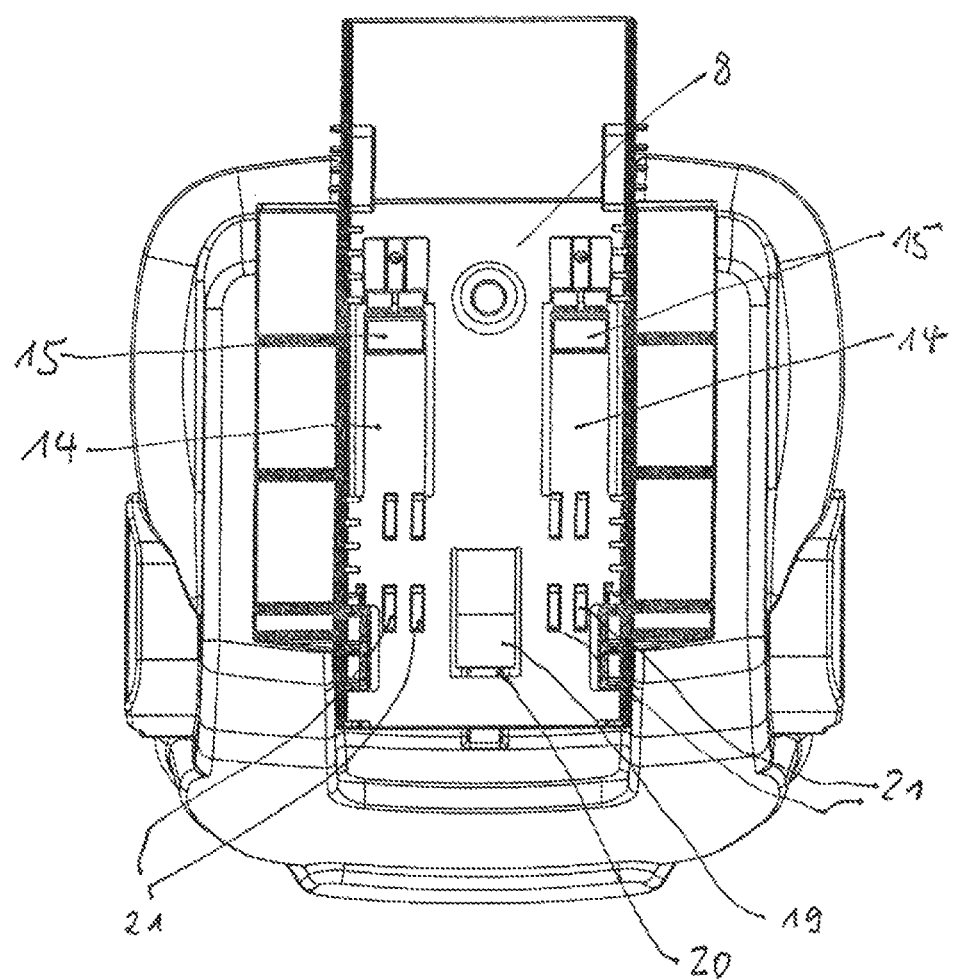
FIG. 4 is an underneath view of the seat.
Figure 5:
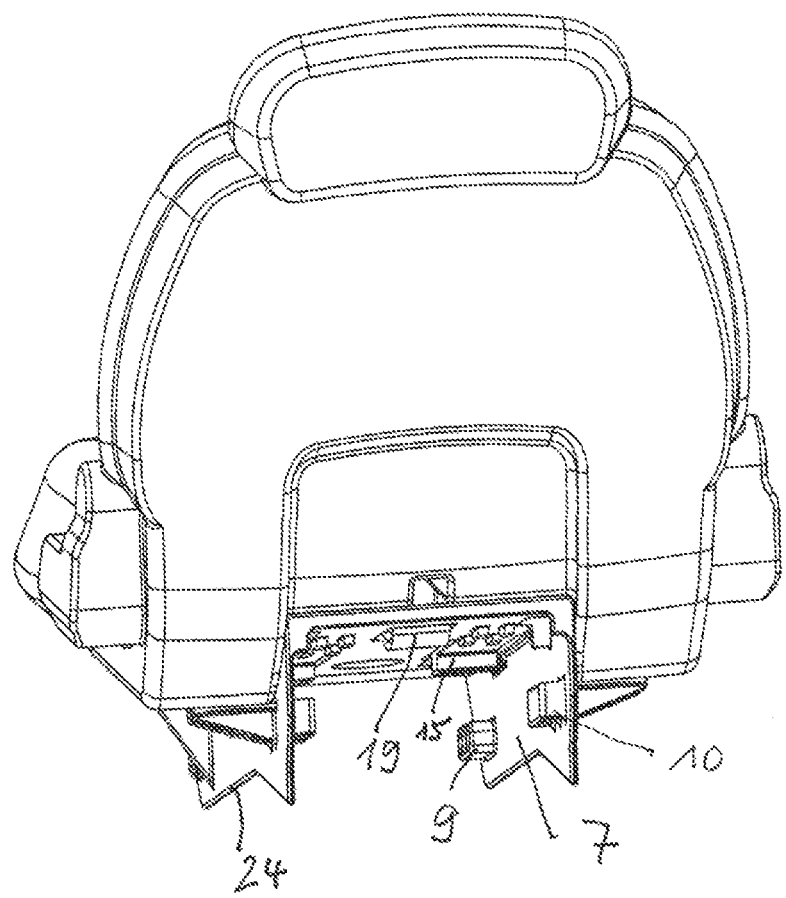
FIG. 5 is a rear view of the seat.

As shown, in particular, in FIGS. 3 and 4, two spring arms 14 are cut free from the base wall 8, which have at their free ends a respective locking element 15 of substantially cubic shape projecting downwardly, i.e. towards the seat block 12. These locking elements 15 are provided for engagement in a respective one of four depressions, which are spaced from one another in the longitudinal direction (arrow A), in the seat block 11. The two spring arms 14 are connected in the region of the locking elements 15 by screws 17 to a handle 18 which, as shown FIG. 2, projects forwardly beneath the seat 1 and can be raised so that the locking elements 15 move out of the respective depressions 16.

Projecting from the underside of the base wall 8 in the region of its rear end section there is a curved leaf spring 19, which is fastened to or integrally formed on the edge of an opening 20. Projecting downwardly from the underside of the base wall 8 on both sides of the leaf spring 19 there are also locking elements 21, which fit into depressions 22 in the upper wall 23 of the seat block 12. The leaf spring 19 engages the wall 23 of the seat block 11 between the depressions 22.

When no one is sitting on the seat 1, the leaf spring 19 raises the entire seat so far that the locking elements 21 move out of the associated depressions 22. The position of the seat can be adjusted in this state. However, when a child sits on the seat 1, the leaf spring 19 is forced back and the locking elements 21 locate in associated depressions 22 so that the adjustment mechanism is locked.

The guide grooves 11 in the seat block 12 have a discontinuity or constriction 23, which act as a stop for the guide elements 10, which are higher than the guide elements 9. The lower edge 24 of the side wall 7 has an angular shape which is matched to the shape of the side walls 25 of the seat block 12 on the base body 13.

Figure 7:
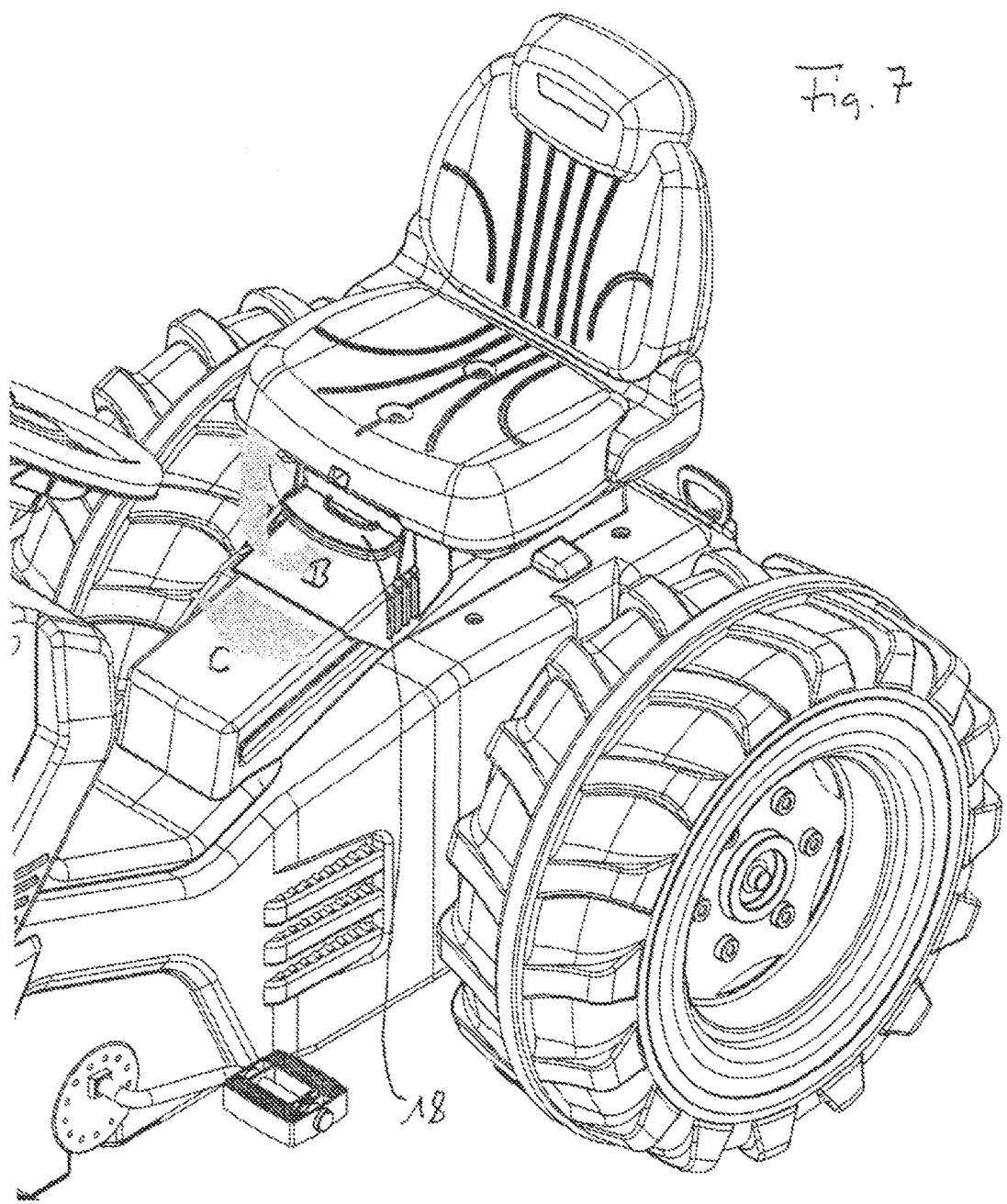
FIG. 7 shows the seat in the rearward position on the children's vehicle.
Figure 8:
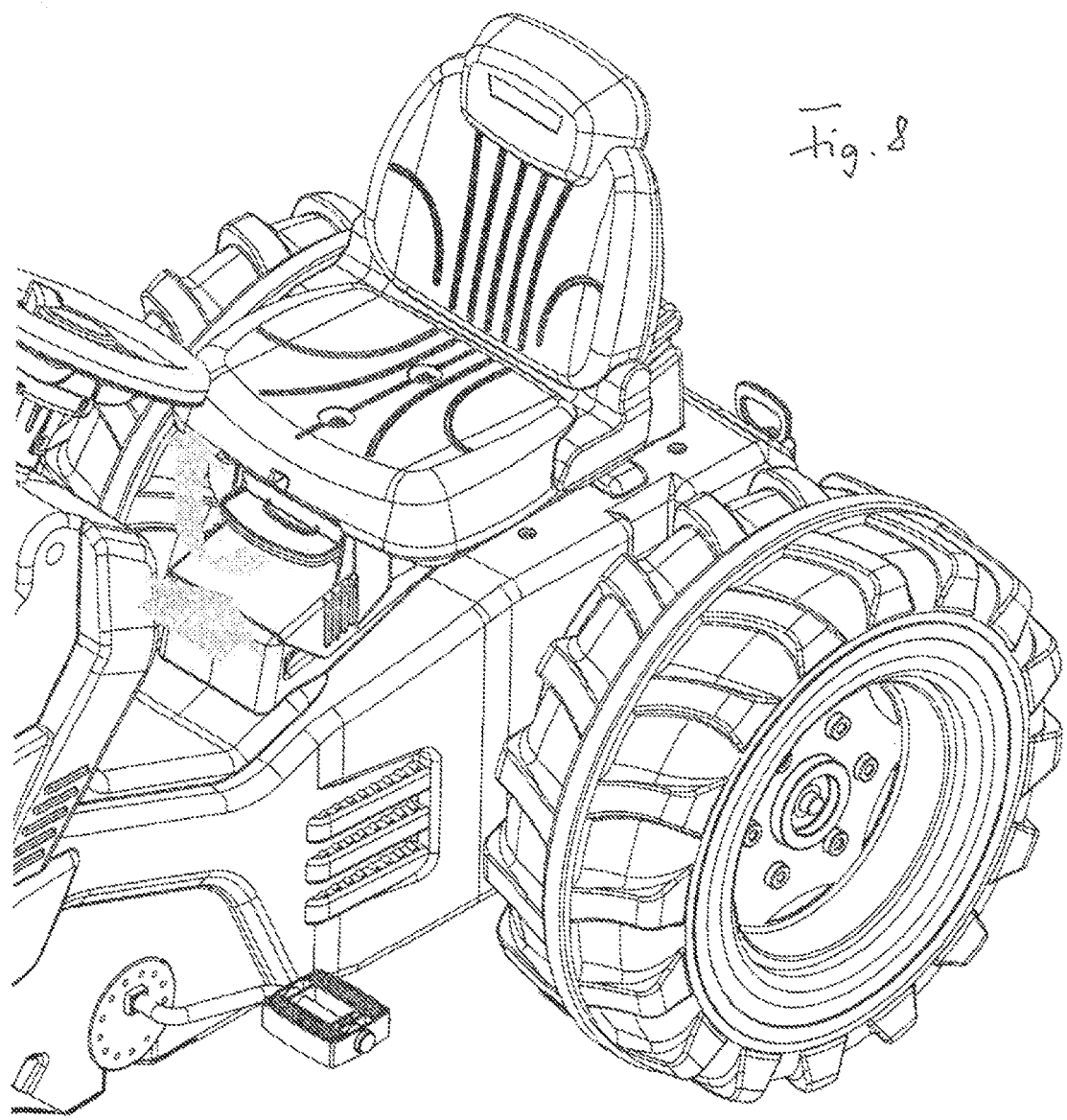
FIG. 8 shows the seat in a moved forward position.

FIG. 6 shows that the assembled seat 1 is slid onto the seat block 12 from the rear of the pedal vehicle. FIG. 7 shows the rear position of the seat on the seat block 12, on which, after raising the handle 18 (arrow B) the seat can be slid forwardly, which is indicated by the arrow C. FIG. 8 shows the front end position of the seat 1 from which the seat can be slid back, when no child is sitting on the seat.

The invention claimed is:

1. A children's vehicle comprising a seat, an adjustable locking device, with which a selected position of the seat in a longitudinal direction of the children's vehicle may be set, and a security locking device, which only releases the adjustable locking device for adjustment of the current position when the seat is unloaded.

2. A children's vehicle as claimed in claim 1, wherein a seat block is arranged on a base body of the children's vehicle, the seat block having plural recesses of the adjustable locking device and plural depressions of the security locking device, the plural recesses and plural depressions being respectively spaced apart in the longitudinal direction.

3. A children's vehicle as claimed in claim 2, wherein a frame portion is fastened beneath the seat, the frame portion having a base wall and two parallel side walls, and wherein guide elements, projecting inwardly from the frame portion engage in guide grooves in outer walls of the seat block.

4. A children's vehicle as claimed in claim 3, wherein the adjustable locking device has at least one spring arm, which is fastened to the base wall and has at its end region a downwardly projecting locking element, which fits into one of the recesses of the adjustable locking device and, in the relaxed state of the spring arm, engages into said one of the recess.

5. A children's vehicle as claimed in claim 4, wherein the adjustable locking device includes two laterally spaced spring arms each with a respective locking element and two correspondingly laterally spaced rows of said recesses.

6. A children's vehicle as claimed in claim 2, wherein a frame portion having a base wall is fastened beneath the seat, the security locking device has a spring device and at least one locking element on the base wall and is configured to engage one of the depressions, and wherein the spring device projects downwardly from the base wall in a relaxed state such that the at least one locking element is out of said one of the depressions.

7. A children's vehicle as claimed in claim 6, wherein the spring device is a curved leaf spring, which is attached to the edge of an opening in the base wall and, when the seat is loaded, is forced into the opening, whereby the at least one locking element moves into one of the depressions.

8. A children's vehicle as claimed in claim 6 wherein the locking elements are formed on both sides of the spring device and two rows of depressions aligned with one another are formed in the seat block.

9. A children's vehicle as claimed in claim 4, wherein the at least one spring arm is connected to a handle projecting forwardly beyond the seat, which may be raised so that the locking elements of the adjustable locking device moves out of the depressions.

10. A children's vehicle as claimed in claim 3, wherein the guide grooves in the outer walls of the seat block have a constriction, which acts as a stop for the guide elements on the frame portion to limit the forward movement of the seat.

* * * * *